United States Patent [19]

Barnard

[11] Patent Number: 4,706,882
[45] Date of Patent: Nov. 17, 1987

[54] ADAPTIVE OPTIMUM START

[75] Inventor: William B. Barnard, Arlington Heights, Ill.

[73] Assignee: Honeywell Inc., Minneapolis, Minn.

[21] Appl. No.: 702,285

[22] Filed: Feb. 15, 1985

[51] Int. Cl.[4] ............................................. F23N 5/20
[52] U.S. Cl. ................................. 236/46 R; 165/12; 364/148
[58] Field of Search ...................... 165/12; 236/46 R; 364/557, 505, 148

[56] References Cited

U.S. PATENT DOCUMENTS

| | | | |
|---|---|---|---|
| 2,569,530 | 10/1951 | Kramer et al. | 236/46 R |
| 3,964,676 | 6/1976 | Rooks et al. | 236/46 R |
| 3,996,452 | 12/1976 | Schulze et al. | |
| 4,106,690 | 8/1978 | Tomlinson | 236/46 R |
| 4,156,502 | 5/1979 | Day | 236/46 R |
| 4,172,555 | 10/1979 | Levine | 236/46 R |
| 4,174,807 | 11/1979 | Smith et al. | 236/47 |
| 4,232,818 | 11/1980 | Christiansen | 236/46 R |
| 4,236,218 | 11/1980 | Killebrew et al. | 364/500 |
| 4,335,847 | 6/1982 | Levine | 165/12 X |
| 4,356,962 | 11/1982 | Levine | 236/11 |
| 4,386,397 | 5/1983 | Saeki | 364/148 |
| 4,408,711 | 10/1983 | Levine | 236/11 |
| 4,410,132 | 10/1983 | Levine | 236/11 |
| 4,475,685 | 10/1984 | Grimado et al. | 236/46 R |
| 4,522,336 | 6/1985 | Culp | 236/46 R |

FOREIGN PATENT DOCUMENTS 2065334  10/1980  United Kingdom .

OTHER PUBLICATIONS

Dictionary of Automotive Control, *Bibbero*, p. 6.
Microprocessors for Building Services & Energy Conservation, *Lush*, pp. 75–79.

*Primary Examiner*—William E. Wayner
*Attorney, Agent, or Firm*—Trevor B. Joike; Stephen W. Buckingham

[57] ABSTRACT

An optimum start system for determining the optimum start time of a temperature control system within a building so that energy can be conserved by operating the temperature control system at reduced energy levels during periods of non-occupancy of the building and by starting the temperature control system an amount of lead time prior to the beginning of occupancy of said building wherein the amount of lead time is selected to bring space temperature within the building within a comfort range by the start of occupancy, the optimum start system including a space temperature sensor for sensing space temperature within the building, an outdoor air temperature sensor for sensing outdoor air temperature external to the building, and a controller connected to the space temperature sensor, the outdoor air temperature sensor and the temperature control system for determining the lead time as a function of an accuracy factor based upon the accuracy of a prior lead time and as a function of both outdoor air temperature and space temperature.

15 Claims, 10 Drawing Figures

OT = OCCUPANCY START TIME
OA = OUTSIDE AIR DAMPERS

ADAPTIVE OPTIMUM START

BACKGROUND OF THE INVENTION

The present invention relates to an optimum start system and, more particularly, to such a system in which the amount of lead time before occupancy during which the temperature control system is energized to bring the space temperature to within the temperature comfort range established for the building is determined as a function of space temperature, outdoor air temperature and an accuracy factor which is based upon the accuracy of at least one prior lead time.

Most control systems which control the condition of air within commercial buildings today have various energy management functions which the control systems can perform. For example, the setpoint temperature within the building can be set-up during summer months and setback during winter months when the building is not occupied in order to reduce the cost of running the air condition control system during times of non-occupancy. During non-occupancy, the setpoint temperature established for a space temperature within the building is established at a level which will cause the temperature control system to operate at a more efficient energy level. More precisely, during winter months, the setpoint temperature during periods of non-occupancy is lowered so that the heating plant will run less and consequently require less energy. On the other hand, during summer months, the setpoint temperature during periods of non-occupancy is raised so that the chiller plant likewise will run less and require less energy.

Setpoint temperature can be defined as not just a single temperature but rather a range of temperatures so that if the space temperature is located within the range, no temperature treatment of the air is required and thus energy will be conserved. For example, the comfort range for the space temperature within a building may be established between 68° F. and 78° F. For purposes of this invention, the lowest temperature of the comfort range will be defined as the low comfort limit and the highest temperature in this range will be defined as the high comfort limit.

Typical temperature control systems with set-up and setback functions can perform an optimum start function. The set-up temperature may be either a specific temperature to which space temperature is allowed to drift during summer unoccupied periods or it may be no defined temperature in those systems in which space temperature is allowed to uncontrollably drift during summer unoccupied periods. According to the optimum start function, the temperature control system reestablishes the comfort range as the setpoint temperature an amount of lead time prior to the start of occupancy so that the space temperature can be brought back from the unoccupied temperature to within the comfort range by the time that occupancy begins. Prior optimum start systems of this nature have relied upon outdoor air temperature to determine this amount of lead time. For example, during the heating months, the colder the outdoor air temperature, the more lead time is necessary during the start-up period in the morning to make sure that space temperature is brought up to within the comfort range by the beginning of occupancy. The use of outdoor air temperature by itself to determine lead time is not ideal because each building, because of its construction and because of external factors other than outdoor temperature, such as wind and solar radiation, does not have the same heat transfer characteristics for the same outdoor air temperature.

Accordingly, optimum start functions have been developed to use space temperature drift rate in order to determine the lead time. In optimum start applications, for example, it has been suggested to turn on the temperature control system sometime during non-occupancy either for a fixed period of time and to measure the temperature change during that period of time or for a variable period of time necessary to change the temperature by a fixed amount. The temperature change is then divided by the period of time in order to determine drift rate (i.e. the rate of temperature change). This rate of temperature change is thus dependent upon building construction and most if not all external conditions. The temperature control equipment is normally turned on during the period of non-occupancy an amount of time prior to occupancy time which is greater than the greatest possible lead time. The difference between the desired temperature at occupancy and the current space temperature is then divided by the drift rate in order to determine the amount of time necessary to bring space temperature up to the desired occupancy temperature. The lead time is substracted from the occupancy time in order to determine the start time at which the setpoint of the temperature control system must be changed in order to bring space temperature up to within the comfort range by the beginning of occupancy.

Such a system requires that the temperature control system be cycled during the nighttime hours either routinely to maintain the setback or set-up temperature or specially because conditions are not such that cycling is required to meet the setback or set-up temperature. If it is undesired to turn the temperature control system on during the nighttime hours solely for the purpose of measuring drift rate, the drift rate can be determined during the last cycle before the temperature control system is in either setback or set-up. However, conditions can change drastically between the beginning of non-occupancy and the start of occpancy such that the use of drift rate resulting from the cycle just prior to the beginning of non-occupancy in determining lead time for the following occupancy period will result in error.

Also, lead time calculations can be erroneous, i.e. the temperature control system brought space temperature to within the comfort range either too early or too late. Accordingly, it is desirable to provide in the optimum start system the ability to learn from past mistakes and correct itself in future lead time determinations. Copending application Ser. No. 448,148 filed on Dec. 9, 1982 discloses one type of an adaptive optimum start system.

SUMMARY OF THE INVENTION

Many of these problems in prior art systems are addressed herein by providing an optimum start system for determining the optimum start time of a temperature control system within a building so that energy can be conserved by operating the temperature control system at reduced (or zero) energy levels during periods of non-occupancy of the building and by starting the temperature control system an amount of lead time prior to the beginning of occupancy of the building wherein the amount of lead time is selected to bring space temperature within a comfort range by the start of occupancy, the optimum start system having a space temperature sensor for sensing space temperature within the building, an outdoor air temperature sensor for sensing outdoor air temperature outside of the building, and a controller connected to the space temperature sensor, the outdoor temperature sensor and the temperature control system for determining the lead time as a function of an accuracy factor based upon the accuracy of at least a prior lead time and as a function of both outdoor air temperature and space temperature.

BRIEF DESCRIPTION OF THE DRAWINGS

These and other features and advantages will become apparent from a detailed consideration of the drawings in which.

DETAILED DESCRIPTION

Figure 1:
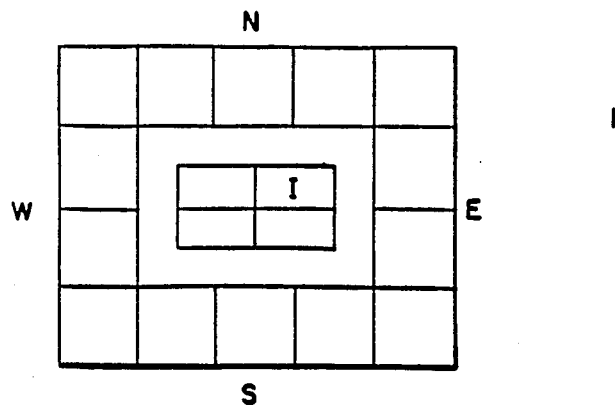
FIG. 1 shows a floor plan of a typical building which may have, by way of example, exterior zones such as north facing zones N, east facing zones E, south facting zones S and west facing zones W, and interior zones I.

The present invention can be used in systems for controlling the space temperature within any size buildings. For purposes of illustration, FIG. 1 shows the floor plan of one floor of a building in which the present optimum start system can be used. This floor plan shows a plurality of exterior zones, i.e. zones which have at least one wall forming the outside perimeter of the building, of which zones E face to the east, zones N face to the north, zones W face to the west, and zones S face to the south. Also, there are a plurality of interior zones I which do not have any walls forming the outside perimeter of the building. It should also be noted that while the exterior zones may represent either cooling loads or heating loads depending upon the season, the interior zones will normally represent a cooling load regardless of the season.

Figure 2:
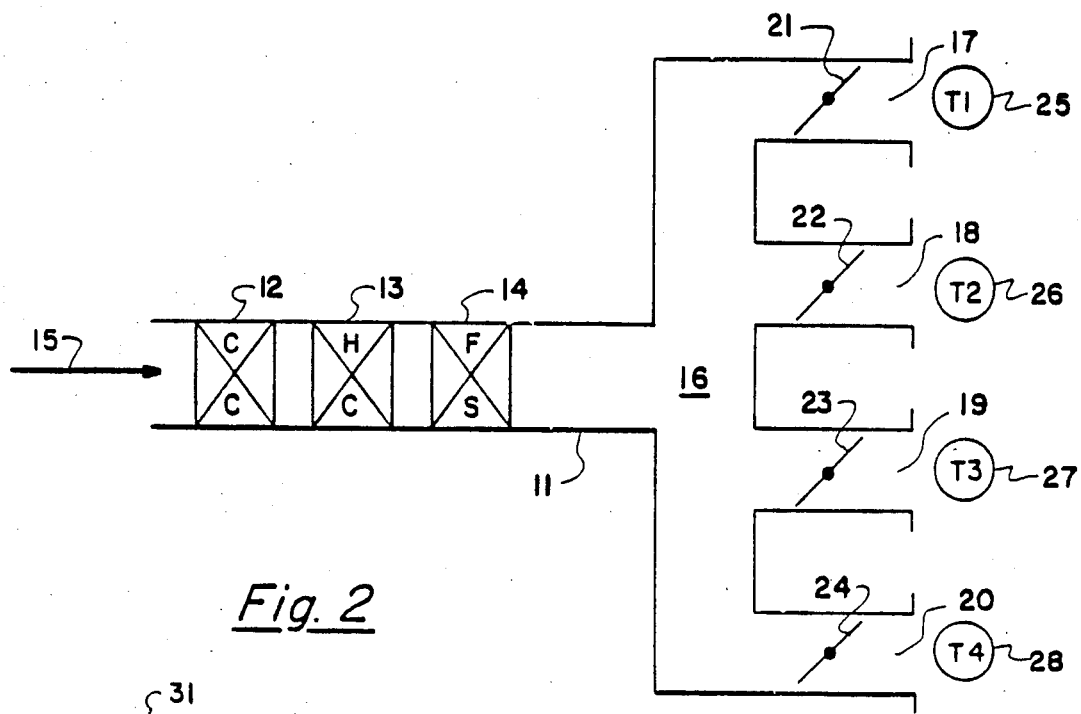
FIG. 2 shows a fan system which can supply temperature controlled air to each of the zones shown in FIG. 1.

FIG. 2 shows a fan system for supplying one or more of the zones N, E, S, W or I as shown in FIG. 1, it being understood that in practice a separate fan system or systems containing only cooling capability must be provided for the interior zone or zones and that a fan system or systems having both heating and cooling capabilities are provided for the exterior zone or zones. For purposes of the present discussion, the fan system shown in FIG. 2 can comprise the temperature control system which is being controlled by the present optimum start system. It should be noted that although the system shown in FIG. 2 is referred to as a temperature control system, the system can also control other physical characteristics such as humidity and pressure.

As shown in FIG. 2, the fan system includes supply air duct 11 having therein coolig coil 12, heating coil 13, and fan 14. Heating coil 12 is supplied with hot water from a boiler in order to heat the air flowing through supply duct 11 and being delivered to the zone. Cooling coil 13 is supplied with chilled water from a chiller under control of various water pumps, valves, and temperature controllers in order to cool the air moving through supply duct 11. Fan 14 drives the air from inlet 15 to discharge air duct 16 so that the air can be supplied to the zone or zones supplied by the fan system shown in FIG. 2.

Although the fan system, which may alternatively be referred to as a temperature control system, shown in FIG. 2 comprises a heating coil, a cooling coil, and a fan, additional or alternative equipment can be included within the air conditioning system. For example, the system may also include pumps, valves, chillers, furnaces, supply fans, return fans, sprayers, humidifiers, and/or secondary chilled water pumps.

As shown in FIG. 2, the air in discharge air duct 16 is supplied to various diffusers 17, 18, 19 and 20 as controlled by corresponding dampers 21, 22, 23 and 24. One or more space temperature sensors can be included in the zone or zones supplied by discharge air duct 16 and may include space temperature sensors 25, 26, 27 and 28 respectively.

Figure 3:
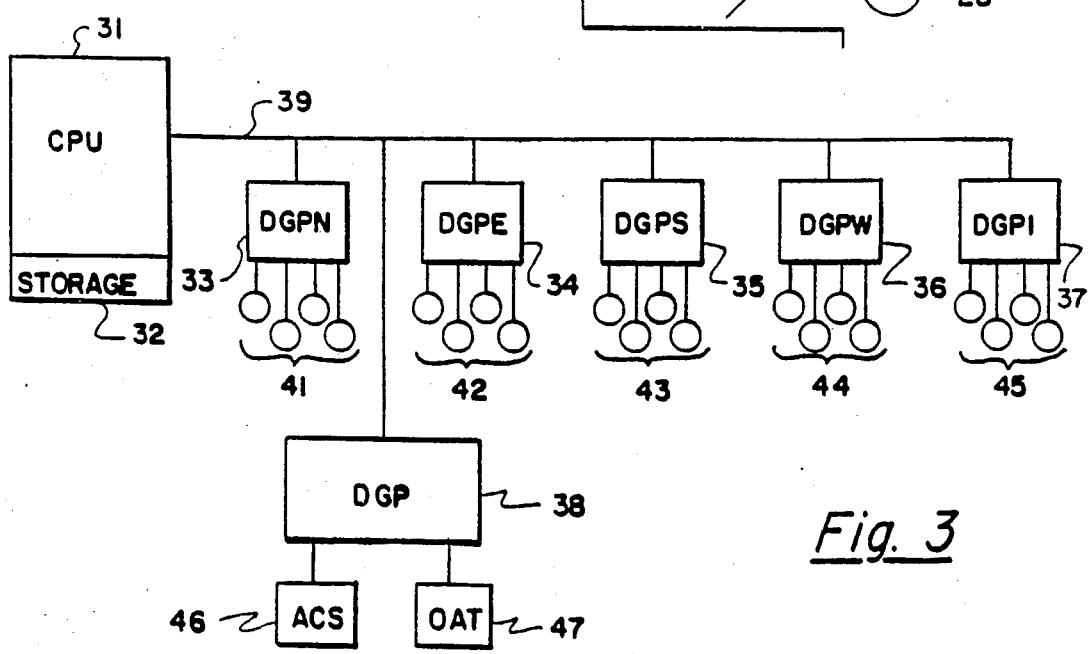
FIG. 3 shows the controller which can be used to control the fan system of FIG. 2.

The control system for controlling the start-up of the fan system shown in FIG. 2 is shown in FIG. 3. This control system includes central processing unit 31 having a storage unit 32 associated therewith. CPU 31 communicates with remote data gathering panels (DGPs) 33, 34, 35, 36, 37, and 38 over common communication channel 39. DGP 33 is shown having a plurality of space temperature inputs 41 monitoring the zone or zones on the north side of the building for the floor shown in FIG. 1, data gathering panel 34 is connected to a plurality of input space temperature sensors 42 for monitoring the space temperatures of the zone or zones on the east side of the building, DGP 35 is connected to a plurality of input temperature sensors 43 for sensing the temperatures of the zone or zones on the south side of the building, DGP 36 is connected to a plurality of input space temperature sensors 44 for sensing the space temperature at various points on the west side of the building, and DGP 37 is connected to a plurality of input space temperature at various sensors 45 for sensing the space temperatures at various points in the interior zone or zones. Additionally, DGP 38 is connected to have an output for turning the air conditioning system 46 on and off and has as an input an outdoor air temperature sensor 47. It should be noted that as referred to herein the turning of an air conditioning system on or off may be the simple act of raising or lowering the setpoint temperature (or setpoint comfort range) for the space temperature. That is, during the winter season, turning the air conditioning system on may simply be the raising of the setpoint temperature to a level which is desirable for periods of occupancy, the space temperature having been controlled at a lower temperature during periods of non-occupancy. The control system shown in FIG. 3 may be any of the Delta automated building control systems manufactured by Honeywell Inc.

FIGS. 4A-4G show the way in which the central processing unit 31 and the data gathering panels 33-38 cooperate in determining the amount of lead time necessary to bring the space temperature from the temperature as it exists during periods of non-occupancy (i.e. the setback or set-up temperature) to within the comfort range by the beginning of occupancy. The determinations represented by FIGS. 4A-4G are made periodically, such as for example every five minutes. Execution will occur at each entry of this routine between the times assigned for end and for start of occupancy.

Figure 4A:
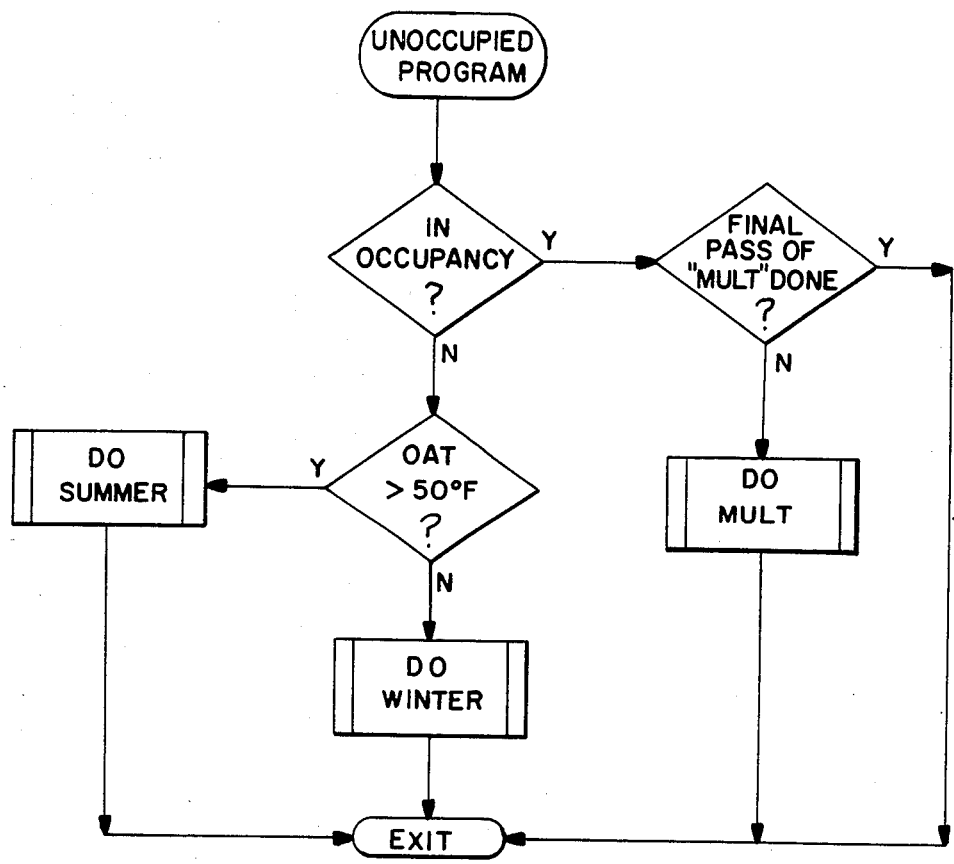
FIGS. 4A-4G show in flow chart form the way in which the control system of FIG. 3 controls the fan system.

As shown in FIG. 4A, upon entry of the routine, if occupancy has not yet started, then a summer/winter test is made by determining whether or not the outdoor air temperature is greater than 50° F. If the outdoor air temperature is greater than 50° F., the summer routine is performed. If outdoor air temperature is not greater than 50° F., then the winter routine is performed. If occupancy has begun, a test is made to verify that the final pass has been executed in determining the accuracy factor or multiplier M. The determination of the accuracy factor or multiplier M will be discussed hereinbelow. For purposes of definition, the start-up period begins when the optimum start command is issued and ends at the start of occupancy.

Figure 4B:
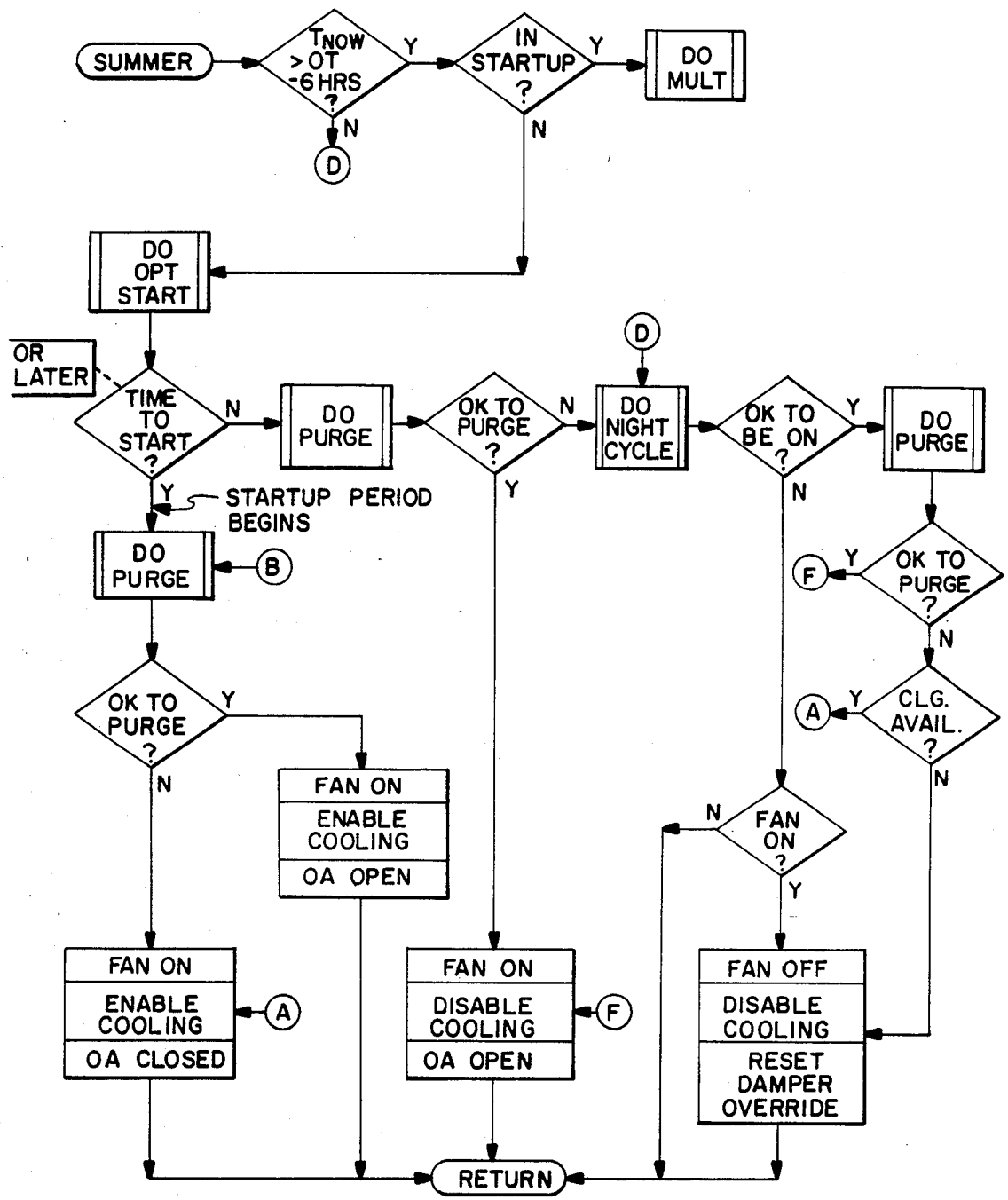

FIG. 4B shows the summer routine which is performed if the outdoor air temperature is greater than 50° F. The optimum start calculation will be first executed a predetermined period of time prior to occupancy, the period of time being selected as greater than the greatest possible lead time necessary for bringing the temperature to within the comfort range by the beginning of occupancy. Thereafter, the optimum start calculation will be repeated at each re-entry (e.g. every five minutes) until the start commands are issued at the calculated start time.

Figure 4C:
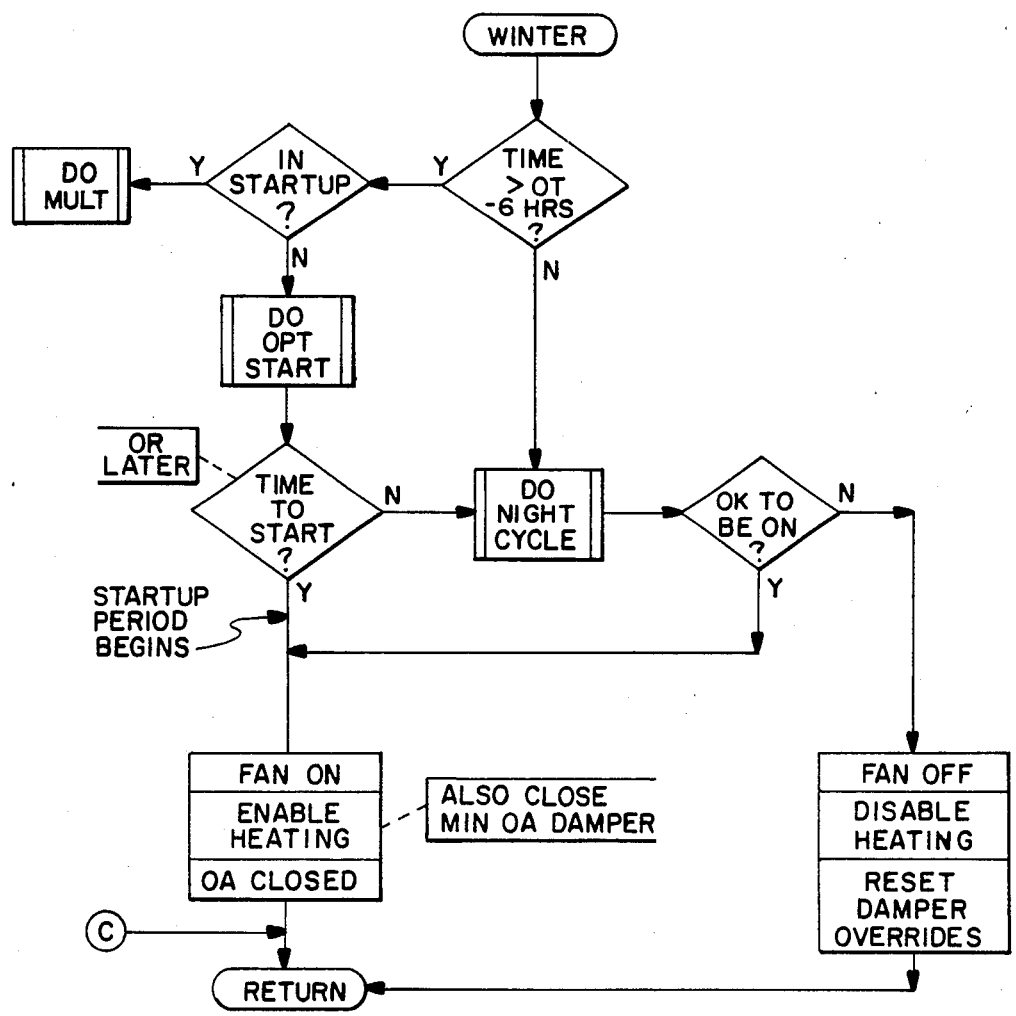
Figure 4D:
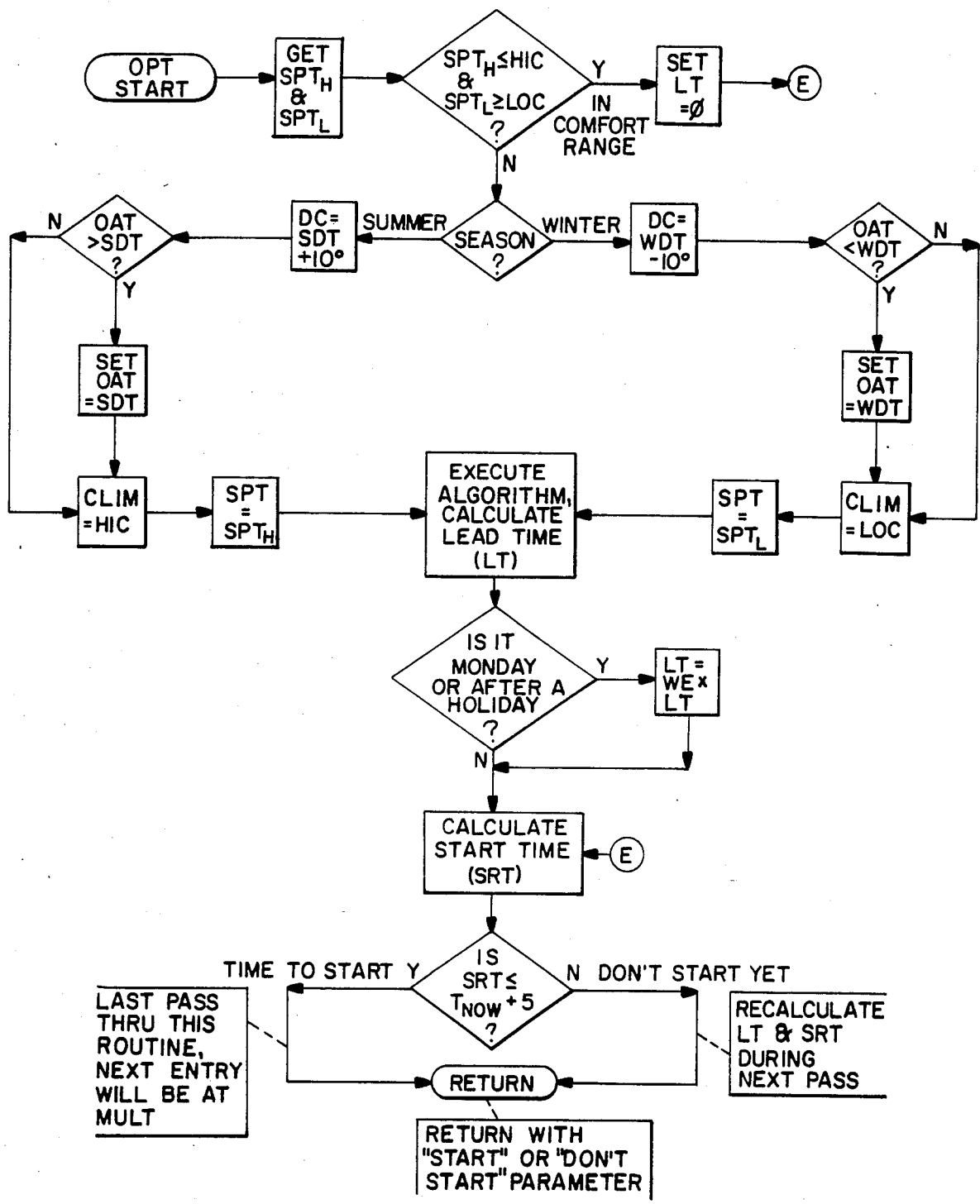
Figure 4E:
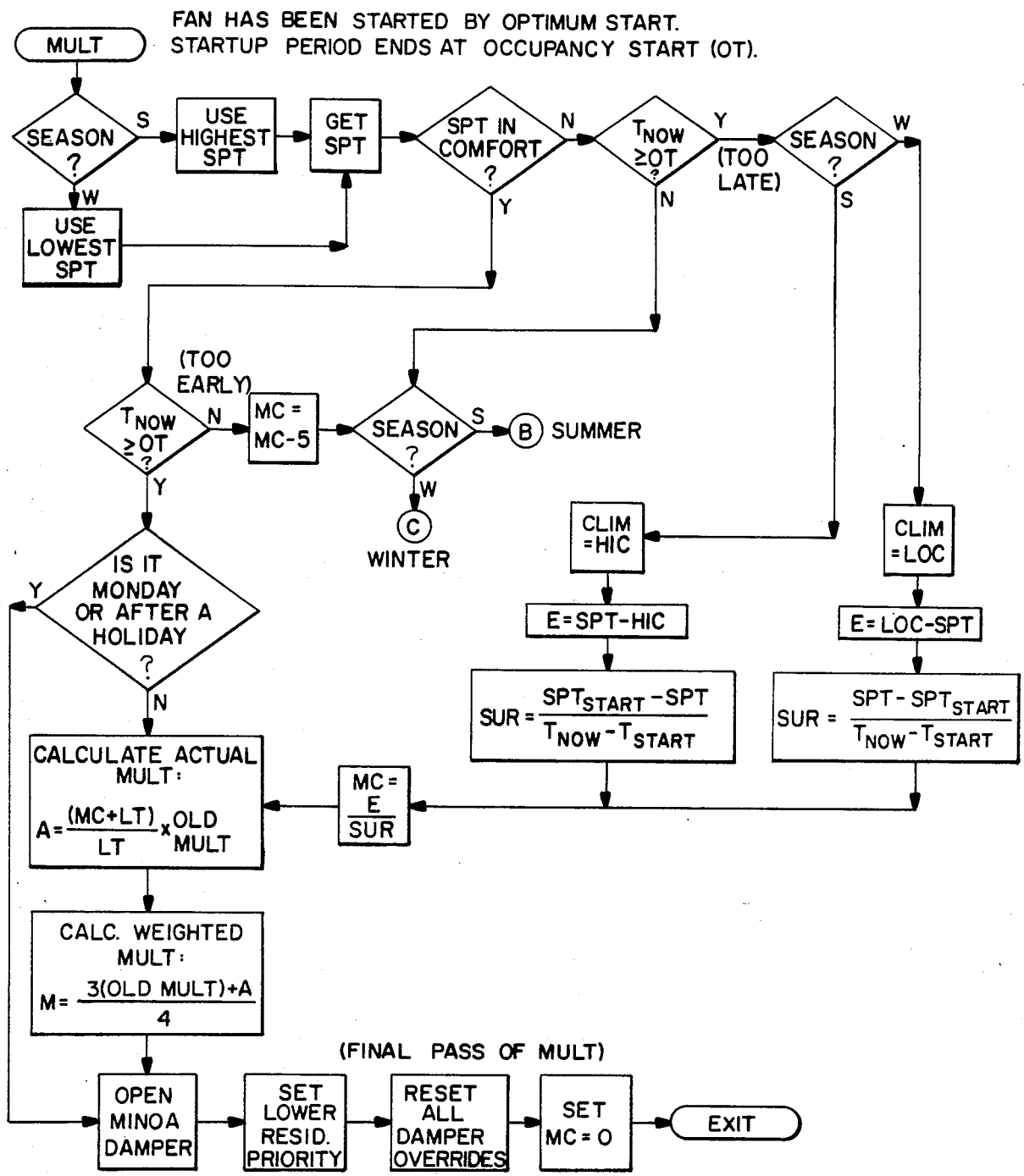
Figure 4F:
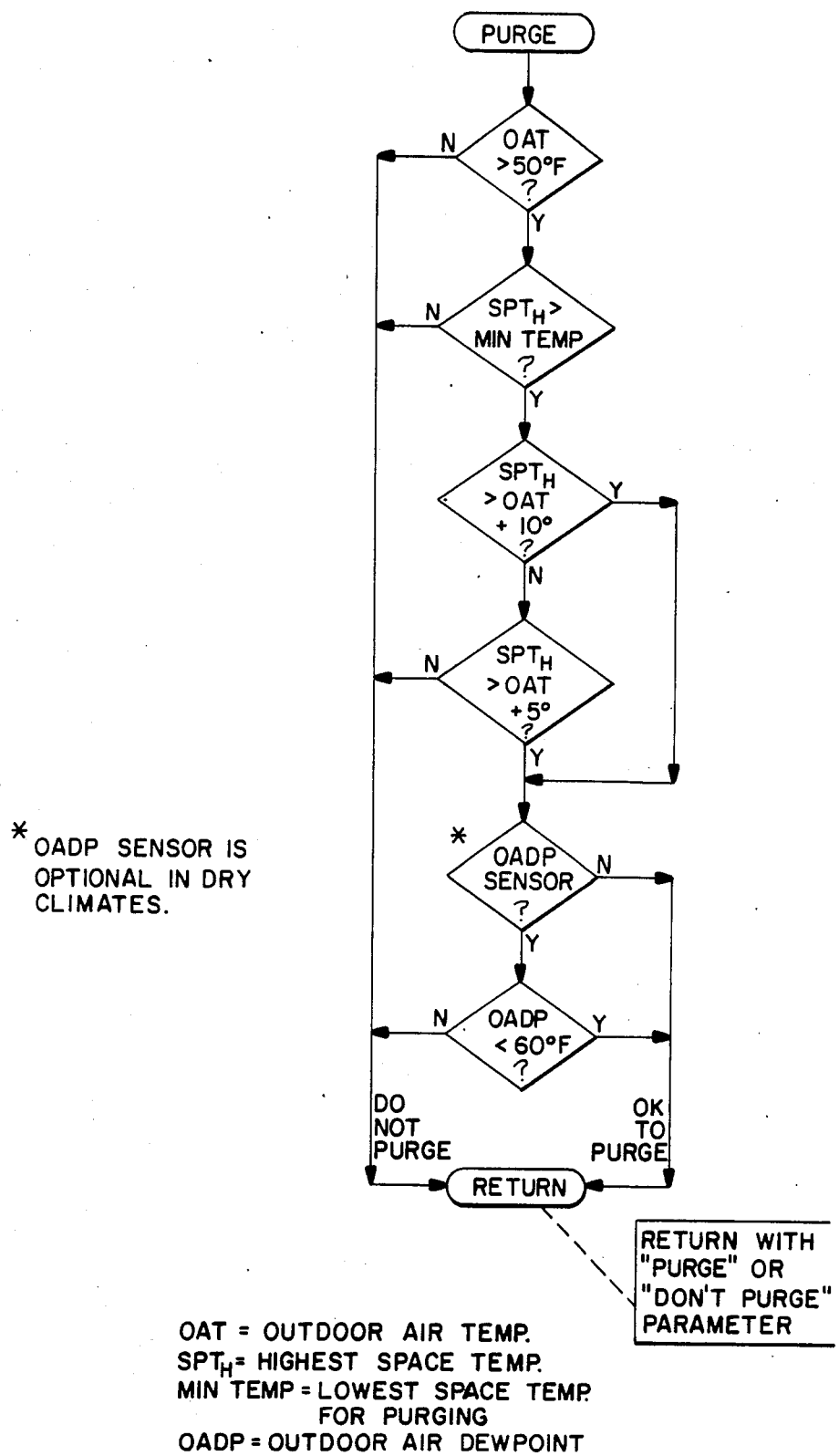
Figure 4G:
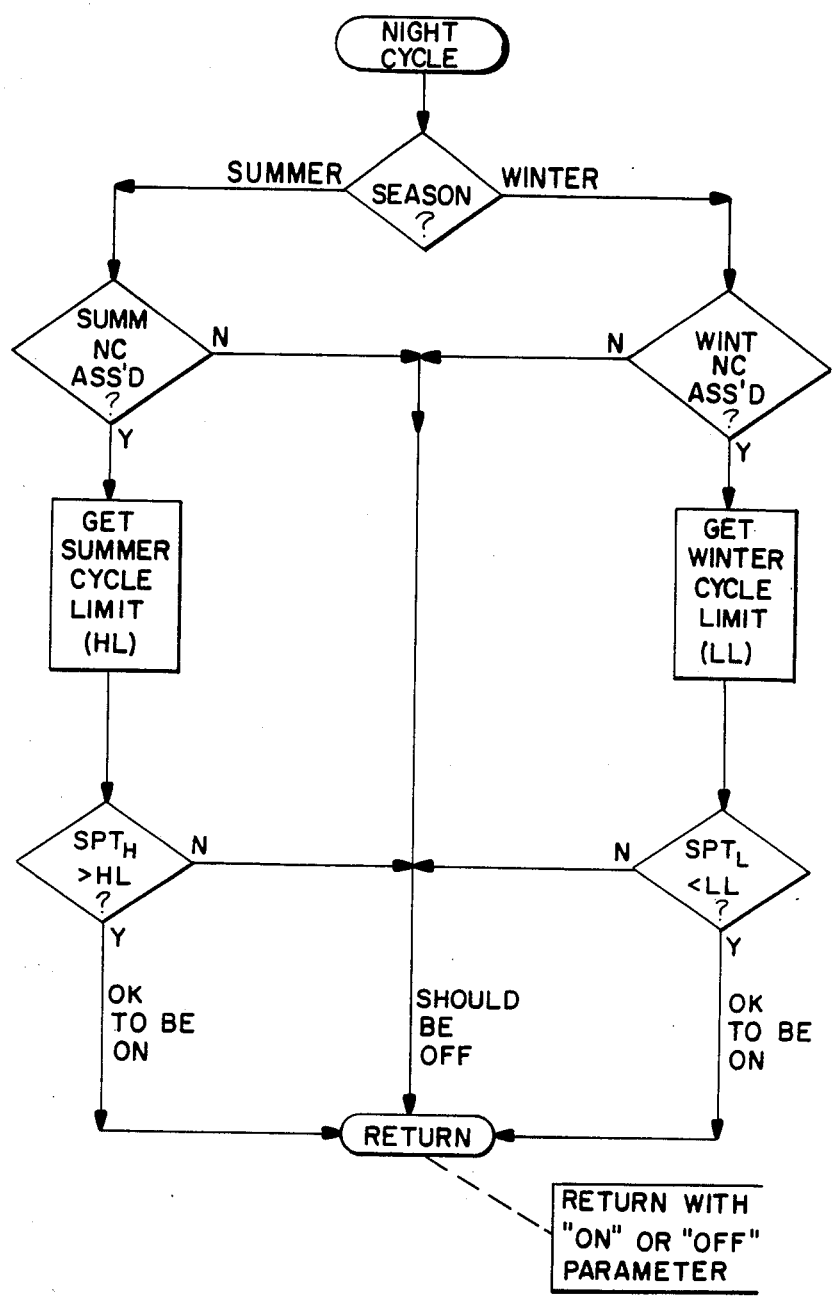

As shown in FIG. 4B, if the present time is not greater than occupancy time minus six hours, then the optimum start time need not be calculated and instead the night cycle routine as shown in FIG. 4G will be performed. The night cycle routine, which will be discussed more fully hereinbelow, will result in the space temperature within the building being controlled at the setback or set-up temperature as defined in the night cycle routine.

If the present time, however, is greater than the occupancy time minus six hours and if the system is in start-up, then the multiplier or accuracy factor M will be determined according to FIG. 4E, the multiplier routine being performed only after the system is in start-up. If the system is not yet in start-up, then the optimum start time is determined according to FIG. 4D. At this point in the operation, the controller will determine the amount of lead time necessary to bring the temperture from the night setback or set-up temperature to the comfort range at the beginning of occupancy and will then subtract the lead time from the occupancy time to determine the start time. The control system will perform this calculation at each entry of the routine and will keep calculating the optimum start time until it is time to perform the optimum start function, i.e. energize the temperature control system or use the occupancy comfort range as the setpoint temperature rather than the setback or set-up temperature during night cycle. FIG. 4D will be discussed more fully hereinbelow.

Thus, according to FIG. 4B, if after the optimum start time is determined it is not yet time to execute the optimum start function, the purge routine is performed according to FIG. 4F. If the purge function can be performed, then the fan is turned on, the cooling system is disabled and the outdoor air damper is opened. Thus, outdoor air is brought into the building as a source of free cooling. On the other hand, if the condition of the outdoor air is such that it cannot be used as a source of free cooling, then it is not okay to perform the purge function and instead the routine will test to see if the fan should be cycled at the assigned summer limit (set-up temperature). If it is okay to turn the fan on, it will next be determined whether or not the system can use outdoor air temperature as a source of free cooling to maintain the summer limit (i.e. set-up) temperature. If so, then the fan is turned on but the cooling system is disabled. If outdoor air cannot be used but if cooling is available through chilling, then the chiller is enabled, the fan is turned on, and the outdoor air damper is closed. If chilling is not available, then the fan is turned off and cooling is disabled.

If it is not appropriate to purge nor to execute the night cycle function, then if the fan is not on, it is kept off, but if the fan is on, it is turned off.

After determining the optimum start time, if it is time to start, i.e. the present time equals the optimum start time, the system will execute the purge routine. If outdoor air can be used as a source of free cooling, the fan is turned on, the cooling plant or chiller is enabled, and the outdoor air damper is opened. On the other hand, if outdoor air cannot be used as a source of free cooling, the fan is turned on, the chiller is enabled, but the outdoor air damper is closed.

When the controller has performed the functions as dictated by FIG. 4B, the controller, as shown in FIG. 4A, will then exit and will reenter the appropriate amount of time later.

If the outdoor air temperature is not above 50° F., the controller will perform the winter routine shown more fully in FIG. 4C. The winter logic is similar to summer except that night purge is never executed in winter. Accordingly, if the present time is not greater than occupancy time less six hours, the night cycle routine shown in FIG. 4G will be performed and a test is made according to the results of FIG. 4G as to whether or not the fan and associated equipment should be on. If not, the fan is turned off, heat is disabled and the dampers are switched to local control. If the fan and associated equipment should be on, then the fan is turned on, heating is enabled and the outdoor air damper is closed.

If the time is greater than occupancy time less six hours, i.e. it is time to determine lead time, it must be determined whether or not the system is now in start-up. If the system is now in start-up, the multiplier routine shown in FIG. 4E will be initiated. If the system is not in start-up, then the optimum start shown in FIG. 4D is performed in order to determine the optimum start time.

If present time is equal to the start time, then it is time for the system to start which will result in the fan being turned on, the heating system being enabled and the outdoor air damper being closed. If it is not yet time to start, then the night cycle determinations and consequent control actions are performed. The system will return to the appropriate step as shown in FIG. 4A at which point the program exits and will reenter the appropriate amount of time later.

FIG. 4D shows the method for determining the optimum start time which is performed at the appropriate steps as indicated in FIGS. 4B and 4C. The controller will first get the current space temperature. In systems which control large buildings, it may be more accurate in determining optimum start time to get the space temperature of the zone having the highest space temperature and the space temperature for the zone having the lowest space temperature. Thus, the highest space temperature can be used in a summer calculation of the optimum start time and the lowest space temperature can be used in a winter determination of optimum start time. During the winter, the lowest space temperature represents the zone which requires the most heating, whereas during summer operation the highest space temperature results from the zone requiring the most cooling.

After the highest and lowest space temperature are obtained, it is next determined whether the highest space temperature is less than or equal to the high comfort limit of the comfort range and whether the lowest space temperature is greater than or equal to the low comfort limit of the comfort range. If both of these conditions are satisfied, then space temperature is within the comfort range and lead time is then set to zero whereat the routine then proceeds directly to calculate start time. If, however, space temperature is not within the comfort range, then there must be a lead time in order to bring space temperature within the comfort range by start of occupancy. Thus, a test is made to determine which season exists. If it is winter, an arbitrary design condition is determined which is the user selected winter design temperature less 10°. The winter design temperature is selected as the most typical outdoor air temperature to which the building is exposed during the winter time and likewise the summer design temperature is the most typical outdoor air temperature to which the building is exposed during the summer. The design condition temperature is therefore a temperature around which lead time can be determined using both the space temperature, the desired temperature as referenced to the appropriate comfort limit temperature, and the outdoor air temperature.

Thus, if the outdoor air temperature is less than the winter design temperature, then the outdoor air temperature is set to the winter design temperature for purposes of making the lead time calculations in order to establish a maximum limit on lead time. If the outdoor air temperature is not less than the winter design temperature, then the outdoor air temperature used in the calculations is the actual outdoor air temperature.

At this point, the comfort limit in this winter calculation is set to the low comfort limit of the comfort range. In the example illustrated above, if the comfort range is 68° F. to 78° F., then the comfort limit temperature is established as 68° F. The lowest space temperature is then selected as the space temperature for purposes of making the lead time calculation. At this point, the lead time as a result of the winter selections is made.

If the season is summer, however, the design condition is selected as the summer design temperature plus 10°. Then, if the outdoor air temperature is greater than the summer design temperature, the outdoor air temperature is set at the summer design temperature for purposes of making the lead time calculation in order to establish a maximum limit on lead time. If not, the actual outdoor air temperature is used. Then, the comfort limit is established as the high comfort temperature limit and the highest space temperature is used as the space temperature for lead time calculations.

At this time, lead time is calculated according to the following equation:

$$LT = |CLIM - SPT| \times \left| \frac{DC - CLIM}{DC - OADB} \right| \times M \quad (1)$$

where LT is lead time, CLIM is the comfort limit temperature, SPT is the space temperature, DC is the design condition temperature as a function of the normal extreme outdoor temperature, OADB is the outdoor air temperature as measured by an outdoor air dry bulb temperature sensor, and M is the correction factor or multiplier.

Once lead time has been calculated, it is next determined whether or not the current day is a Monday or the day after a holiday. Because of the thermal mass of a building, prolonged set-up or setback temperatures as may occur during holidays or weekends may require more extended start-up periods than might otherwise be required after a weekday. Accordingly, if the current day is a Monday or the day after a holiday, the lead time is multiplied by a weekend factor, WE, which is typically greater than one and may, for example, be 1.25. This factor will cause an earlier start-up after weekend or holiday shutdowns to compensate for the additional mass thermal storage.

Accordingly, start time is calculated using the unfactored lead time if the current day is not on Monday or the day after a holiday or, if the current day is a Monday or the day after a holiday, then the factored lead time is used. Start time is simply determined by subtracting lead time from the occupancy time, i.e. occupancy start time.

If it is next determined that the start time is less than or equal to the present time plus five minutes, the optimum start routine issues the TIME TO START signal and the routine will return to either the summer or winter routine at the indicated step with a start parameter. The five minutes is added to account for a maximum of a five minute error which may be introduced into the determination because the system has a resolution of five minutes (i.e. the reentry period is five minutes).

If the start time is not less than or equal to the current temperature plus five minutes, a DON'T START YET parameter is set and the system returns to the indicated step in FIG. 4B or 4C and the system accordingly is not started by the optimum start routine during this pass.

FIG. 4E shows the way in which the accuracy factor or multiplier M is determined. As can be seen from FIGS. 4B and 4C, the multiplier routine is entered during each pass after the system is in start-up, i.e. after the optimum start instruction has been executed. Also as shown in FIG. 4A, the multiplier routine is entered during a final pass after the start of occupancy. If the season is summer, the highest space temperature is used for the multiplier calculation but if the season is winter then the lowest space temperature is used.

If the space temperature is not within the comfort range and if the current time is not greater than or equal to the occupancy time, then the system is still in start-up and is attempting to bring space temperature within the comfort range by the start of occupancy. Thus, during summer, the system will return to point B in the summer routine and during winter will return to point C in the winter routine. Thus, during summer the purge will be executed if conditions are proper and during winter the system will simply wait for the next pass.

If the space temperature is brought within the comfort range at approximately the same time as the occupancy start time (i.e. if space temperature is within the comfort range and if the current time is greater than or equal to the occupancy start time), then the correction or M factor is determined based upon MC being equal to 0. MC is 0 since MC was set to 0 after M was determined on the prior day and since MC was not alterred during the current calculation because the lead time was accurate.

If the space temperature is within the comfort range and the present time is not greater than or equal to the occupancy time, however, then the optimum start command was issued too soon. If so, the factor MC is decremented by one count, i.e. five minutes, and will return to point B in the summer routine or point C in the winter routine. If the season is summer, accordingly, the purge routine will be entered so that outdoor air can be used if it is a source of free cooling until occupancy time has been reached. During the winter routine, the system simply exits to wait for the next pass. For each pass in which the space temperature is within the comfort range but the current time is not greater than or equal to the occupancy time, the factor MC will be decremented by five. At the point where the current time is now equal to or greater than occupancy time, a test is made to determine whether or not the current day is a Monday or the day after a holiday. If not, then the finally determined MC factor is used in determining the correction factor M. If the current day is a Monday or the day after a holiday, the correction factor is not determined because it is assumed that the extended setback or set-up period throughout the weekend or holiday will not result in an accurate M factor. The way in which the M factor is calculated will be described hereinbelow.

If space temperature is not within the comfort range at the start of occupancy, then the system is too late in bringing the space temperature within the comfort range and the factor MC will have to be extrapolated. During the winter, this factor is extrapolated by setting the comfort limit temperature to the lower comfort limit temperature and subtracting space temperature from the lower comfort limit temperature to determine quantity E. Quantity SUR is then determined by dividing a first quantity derived by subtracting the space temperature at the beginning of the start-up period from the current space temperature by a second quantity derived by subtracting the time at the beginning of the start-up period from the current time. If the season is summer, then the high comfort limit is used for the comfort limit CLIM and the high comfort limit temperature is subtracted from the space temperature to yield the quantity E. SUR is determined by subtracting the current space temperature from the space temperature existing at the beginning of the start-up period and dividing this result by the result obtained from subtracting the time at the beginning of the start-up period from the current time. Either way, MC is determined by dividing the quantity E by the start-up rate, SUR.

As indicated, the factor MC is measured if space temperature is brought within the comfort range prior to occupancy time, it is 0 if space temperature is brought within the comfort range at occupancy time, and it is extrapolated if the space temperature is brought within the comfort range too late, i.e. after occupancy time.

The factor MC is then used in the equation shown in FIG. 4E to determine quantity A. Accordingly, the old multiplier is adjusted according to the accuracy of the present lead time. A further calculation is made then to weight the multiplier to minimize the effect of daily aberrations. Thus, in the example, the old multiplier is given three times the weight of the new quantity A.

As should be noted, the new multiplier or correction factor M is not determined until after the occupancy start time has been reached. After the correction factor is determined or after the occupancy start time has been reached and the current day is a Monday or the day after a holiday, the minimum outdoor air damper is opened, a lower priority is set for this routine, all damper overrides are reset, and the factor MC used in the multiplier calculation is set to 0. The system then exits.

It should also be noted that for the first day that the system shown in FIG. 3 is operational, the correction of M factor can arbitrarily be set to a predetermined value such as 1.

FIG. 4F shows the purge routine. According to this routine, various conditions are tested in order to determine whether outdoor air can be used as a free source of cooling. All of the following conditions must be met in order for purging to be started: OAT is greater than 50° F. and the highest space temperature is greater than an assigned minimum (MIN TEMP) and the highest space temperature is greater than OAT plus 10° F. and OADF is greater than 60° F. (Note that the dewpoint sensor is optional and if not present, the dewpoint test is not made.) If all of the above conditions are met, the program returns to the summer routine with the "PURGE" parameter. If one or more conditions are not met, the program returns with the "DON'T PURGE" parameter, except that purging will continue when the highest space temperature drops below OAT plus 10° F. until the highest space temperature is no longer greater than OAT plus 5° F. whereupon the program will return with the "DON'T PURGE" parameter. Once it is determined whether or not purge can be executed, the system returns to the appropriate step in the summer routine.

The night cycle routine is shown in FIG. 4G. If the season is summer, a test is first made to determine whether or not a summer night cycle routine is assigned. If so, then the system gets the summer cycle limit temperature (HL) and a test is made to determine whether or not the highest space temperature is greater than the cycle limit temperature. If the highest space temperature is not greater than the summer cycle limit temperature, then the fan should not be on. On the other hand if the highest space temperature is greater than the summer cycle limit temperature, then the fan can be on.

During the winter season, it must first be determined whether or not winter night cycle has been assigned. If it has, the system gets the winter cycle limit temperature and a test is made to determine whether the lowest space temperature is less than the winter cycle limit temperature. If not, the fan should be off. If so, the fan can be on.

Once it is determined whether the fan should be on or off for night cycle execution, the system returns to the appropriate step in the SUMMER or WINTER routine.

The embodiments of the invention in which an exclusive property or right is claimed are defined as follows:

1. An aptimum start system for determining the optimum start time of a temperature control system within a building so that energy can be conserved by operating the temperature control system at reduced energy levels during periods of non-occupancy of the building and by starting the temperature control system an amount of lead time prior to the beginning of occupancy of said building wherein the amount of lead time is selected to bring space temperature within said building within a comfort range by the start of occupancy, siad optimum start system comprising:
    space temperature sensing means for sensing space temperature within said building;

outdoor air temperature sensing means for sensing outdoor air temperature external to the building; and, controller means connected to said space temperature sensing means, said outdoor air temperature sensing means, and said temperature control system for determining said lead time as a function of a correction factor derived by averaging the accuracy of the lead time of the current day and a correction factor for at least a prior day, said correction factor of said prior day being given a predetermined weight with regard to the accuracy of the current lead time, and as a function of the temperature sensed by one of said temperature sensing means.

2. The optimum start system of claim 1 wherein said controller means includes means for determining said correction factor according to the following equation:

$$A = \frac{MC + LT}{LT} \times M^*$$

where A represents an accuracy quantity, MC is a quantity proportional to the accuracy of the latest lead time, LT is the latest lead time, and M* is a correction factor from a prior day.

3. The optimum start system of claim 2 wherein said controller means includes means for determining a weighted correction factor according to the equation:

$$M = \frac{3(M^* + A)}{4}$$

where M is the weighted correction factor.

4. An optimum start system for determining the optimum start time of a temperature control system within a building so that energy can be conserved by operating the temperature control system at reduced energy levels during periods of non-occupancy of the building and by starting the temperature control system an amount of lead time prior to the beginning of occupancy of said building wherein the amount of lead time is selected to bring space temperature within said building within a comfort range by the start of occupancy, said optimum start system comprising:

space temperature sensing means for sensing space temperature within said building;

outdoor air temperature sensing means for sensing outdoor air temperature external to the building; and, controller means connected to said space temperature sensing means, said outdoor air temperature sensing means, and said temperature control system for determining said lead time as a function of a correction factor based upon the accuracy of at least a prior lead time and as a function of both outdoor air temperature and space temperature, wherein said controller means includes means for determining lead time by the following equation:

$$LT = |CLIM - SPT| \times \left| \frac{DC - CLIM}{DC - OADB} \right| \times M$$

where LT is lead time, CLIM is the desired temperature, SPT is the space temperature, DC is an arbitrary predetermined design condition temperature, OADB is the outdoor temperature, and M is the correction factor.

5. The optimum start system of claim 4 wherein said controller means includes means for establishing a range of temperatures as the desired temperature, the range having a high limit and a low limit, wherein CLIM is the high limit during summer operation and the low limit during winter operation.

6. The optimum start system of claim 5 wherein said controller means includes means for determining said correction factor as a weighted average based upon at least a prior correction factor.

7. The optimum start system of claim 6 wherein said controller means includes means for determining said correction factor according to the following equation:

$$A = \frac{MC + LT}{LT} \times M^*$$

where A represents an accuracy quantity, MC is a quantity proportional to the accuracy of the latest lead time, LT is the latest lead time, and M* is a correction factor from a prior day.

8. The optimum start system of claim 7 wherein said controller means includes means for determining a weighted correction factor according to the equation:

$$M = \frac{3(M^* + A)}{4}$$

where M is the weighted correction factor.

9. An optimum start system for determining the optimum start time of a temperature control system within a building so that energy can be conserved by operating the temperature control system at reduced energy levels during periods of non-occupancy of the building and by starting the temperature control system an amount of lead time prior to the beginning of occupancy of said building wherein the amount of lead time is selected to bring space temperature within said building within a comfort range by the start of occupancy, said optimum start system comprising:

space temperature sensing means for sensing space temperature within said building;

outdoor air temperature sensing means for sensing outdoor air temperature external to the building; and, controller means connected to said space temperature sensing means, said outdoor air temperature sensing means, and said temperature control system for determining said lead time as a function of a correction factor based upon the accuracy of at least a prior lead time and as a function of both outdoor air temperature and space temperature, wherein said controller means includes means for determining said correction factor as a weighted average based upon at least a prior correction factor and means for determining said correction factor according to the following equation:

$$A = \frac{MC + LT}{LT} \times M^*$$

where A represents an accuracy quantity, MC is a quantity proportional to the accuracy of the latest lead time, LT is the latest lead time, and M* is a correction factor from a prior day.

10. The optimum start system of claim 9 wherein said controller means includes means for determining a weighted correction factor according to the equation:

$$M = \frac{3(M^* + A)}{4}$$

where M is the weighted correction factor.

11. An optimum start system for determining the optimum start time of a temperature control system within a building so that energy can be conserved by operating the temperature control system at reduced energy levels during periods of non-occupancy of the building and by starting the temperature control system an amount of lead time prior to the beginning of occupancy of said building wherein the amount of lead time is selected to bring space temperature within said building within a comfort range by the start of occupancy, said optimum start system comprising:

space temperature sensing means for sensing space temperature within said building;

outdoor air temperature sensing means for sensing outdoor air temperature external to the building; and, controller means connected to said space temperature sensing means, said outdoor air temperature sensing means, and said temperature control system for determining said lead time according to three functions, a first function which is related to the difference between a desired comfort limit temperature and space temperature, a second function based upon the ratio of two quantities, the first quantity based upon a desired comfort limit temperature and the second quantity being based upon outdoor air temperature, and a third function defined as a correction factor which is based upon the accuracy of at least one prior lead time.

12. The optimum start system of claim 11 wherein said controller means includes means for determining said correction factor as a weighted average based upon at least a prior correction factor.

13. The optimum start system of claim 12 wherein said controller means includes means for determining said correction factor according to the following equation:

$$A = \frac{MC + LT}{LT} \times M^*$$

where A represents an accuracy quantity, MC is a quantity proportional to the accuracy of the latest lead time, LT is the latest lead time, and $M^*$ is a correction factor from a prior day.

14. The optimum start system of claim 13 wherein said controller means includes means for determining a weighted correction factor according to the equation:

$$M = \frac{3(M^* + A)}{4}$$

where M is the weighted correction factor.

15. The optimum start system of claim 14 wherein said controller means includes means for determining lead time by the following equation:

$$LT = |CLIM - SPT| \times \left| \frac{DC - CLIM}{DC - OADB} \right| \times M$$

where LT is lead time, CLIM is a desired temperature, SPT is the space temperature, DC is an arbitrary predetermined design condition temperature, OADB is the outdoor temperature, and M is the correction factor.

* * * * *

UNITED STATES PATENT AND TRADEMARK OFFICE
CERTIFICATE OF CORRECTION

PATENT NO. : 4,706,882

DATED : November 17, 1987

INVENTOR(S) : WILLIAM B. BARNARD

It is certified that error appears in the above-identified patent and that said Letters Patent is hereby corrected as shown below:

Column 10, line 56, cancel "aptimum and substitute

--optimum--.

Column 10, line 65, cancel "siad" and substitute

--said--.

Signed and Sealed this

Twelfth Day of April, 1988

Attest:

DONALD J. QUIGG

Attesting Officer

Commissioner of Patents and Trademarks